(12) United States Patent
Hayashi et al.

(10) Patent No.: US 7,785,525 B2
(45) Date of Patent: Aug. 31, 2010

(54) RTM MOLDING METHOD

(75) Inventors: Noriya Hayashi, Nagoya (JP); Hiroshi Mizuno, Nagoya (JP); Koichi Hasegawa, Nagoya (JP); Kazuo Ota, Nagoya (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 11/989,133

(22) PCT Filed: Jul. 27, 2006

(86) PCT No.: PCT/JP2006/314848
§ 371 (c)(1),
(2), (4) Date: Apr. 18, 2008

(87) PCT Pub. No.: WO2007/013544
PCT Pub. Date: Feb. 1, 2007

(65) Prior Publication Data
US 2009/0051067 A1    Feb. 26, 2009

(30) Foreign Application Priority Data
Jul. 27, 2005   (JP)  .............................. 2005-216690

(51) Int. Cl.
B29B 13/08    (2006.01)
B27N 3/12    (2006.01)
B29C 45/02    (2006.01)

(52) U.S. Cl. .................. 264/494; 264/257; 264/327; 264/328.4

(58) Field of Classification Search ............ 264/494, 264/495, 257, 327, 328.4, 328.17
See application file for complete search history.

(56) References Cited

U.S. PATENT DOCUMENTS

| 4,385,957 | A | * | 5/1983 | Wackerle et al. | ......... 156/273.9 |
| 5,114,633 | A | * | 5/1992 | Stewart | ..................... 264/444 |
| 5,516,271 | A | * | 5/1996 | Swenor et al. | ............. 425/127 |
| 5,916,509 | A | * | 6/1999 | Durhman | .................... 264/477 |

(Continued)

FOREIGN PATENT DOCUMENTS

JP    57-208210    12/1982

(Continued)

OTHER PUBLICATIONS

Machine Translation of JP 2005-001306 A, Jun. 2005, Yamamoto et al.*

Primary Examiner—Joseph S Del Sole
Assistant Examiner—Ryan Ochylski
(74) Attorney, Agent, or Firm—Wenderoth, Lind & Ponack, L.L.P.

(57) ABSTRACT

Provided is an RTM molding method enabling to yield an FRP molded body formed so as to be increased in the fiber volume content and to thereby be made more excellent in strength and lightweightness. The resin composition is a chain-curing resin composition, and after the initiation of the curing of the resin composition, the highest temperature at the curing head of the resin composition, undergoing chain curing, within 10 seconds after the initiation of the curing is increased to be higher by 50° C. or more than the temperature of the resin composition at after the impregnation and before the curing, and thus, the resin composition is chain-cured with a Vf of 41% or more.

4 Claims, 2 Drawing Sheets

| 1 | Mold | 12 | Energy Ray Transmission Window |
| 2 | Aluminum jig | 13 | Aluminum block |
| 3 | Glass plate | 14 | Resin reservoir |
| 4 | Glass plate | 15 | Pressurized vessel |
| 5 | Reinforcing fiber material | 16 | Resin tank |
| 9 | Suction line | 17 | Thermocouples |
| 11 | Valve | | |

U.S. PATENT DOCUMENTS

| | | | | |
|---|---|---|---|---|
| 6,245,827 | B1 * | 6/2001 | Gregory | 522/13 |
| 6,599,954 | B1 * | 7/2003 | Hayashi et al. | 522/25 |
| 6,861,455 | B2 * | 3/2005 | Hayashi | 522/25 |
| 6,919,385 | B2 * | 7/2005 | Hayashi | 522/25 |
| 2004/0069770 | A1 * | 4/2004 | Cary et al. | 219/522 |

FOREIGN PATENT DOCUMENTS

| | | |
|---|---|---|
| JP | 5-505352 | 8/1993 |
| JP | 7-507836 | 8/1995 |
| JP | 08-283388 | 10/1996 |
| JP | 11-193322 | 7/1999 |
| JP | 2001-002760 | 1/2001 |
| JP | 2001-089639 | 4/2001 |
| JP | 2003-071856 | 3/2003 |
| JP | 2004-314315 | 11/2004 |
| JP | 2005-001306 | 1/2005 |
| JP | 2005-022396 | 1/2005 |
| WO | 91/10547 | 7/1991 |
| WO | 94/21455 | 9/1994 |

* cited by examiner

1  Mold
2  Aluminum jig
3  Glass plate
4  Glass plate
5  Reinforcing fiber material
9  Suction line
11 Valve 12 Energy Ray Transmission Window
13 Aluminum block
14 Resin reservoir
15 Pressurized vessel
16 Resin tank
17 Thermocouples 17 Thermocouples
18 Impregnation/curing observation window
Resin impregnation

RTM MOLDING METHOD

TECHNICAL FIELD

The present invention relates to a resin transfer molding (hereinafter, also referred to as RTM both in the claims and in the description) method used in molding a structural body made of a fiber reinforced plastic (hereinafter, also referred to as FRP), in particular, to an RTM molding method enabling to yield an FRP molded body formed so as to be increased in the fiber volume content (hereinafter, abbreviated as Vf as the case may be) and to thereby be made more excellent in strength and lightweightness.

BACKGROUND ART

In these years, energy ray-curable resins typified by UV-curable resins have been used in various fields and applications, such resins being characterized in that only those portions thereof irradiated with energy ray at a certain dose or more are cured. On the other hand, energy ray typified by UV is characterized in that the energy ray is attenuated in the course of transmitting through the resin and hence hardly reaches the deep portion of the resin, or energy ray is largely attenuated or absorbed, for example, by those substances that absorb radiation having the same wavelength as that of the energy ray.

Accordingly, a light-curable resin suffers the following problems: a problem that a light-curable resin undergoes curing limited to a surface layer, reached by an energy ray, of a depth ranging from a few microns to a few millimeters, and thus, the deep portion of the resin remains uncured so as to be hardly applicable or inapplicable to thick-walled materials; and a problem that when a light-curable resin contains an energy ray transmission blocking substance such as a filler, curing failure is readily caused to result in incurability. Thus, the application ranges of such light-curable resins are mainly limited to photoresists, coatings, coating compositions, adhesives, varnishes and the like.

Typical examples of the solutions for such problems include: highly UV-curable resins (active energy ray-curable compositions, products of Mitsubishi Rayon Co., Ltd., Patent Document 1: Japanese Patent Laid-Open No. 8-283388); and UV/heat-curable resins (Optomer KS Series, products of Asahi Denka Ind. Co., Ltd.; Radicure, product of Hitachi Chemical Co., Ltd.; UE resins, products of Toyobo Co., Ltd., Patent Document 2: Japanese Patent Publication No. 61-38023). However, the highly UV-curable resins are still not free from a problem that such resins become incurable when energy ray is blocked by a filler or the like. The UV/heat-curable resins that undergo UV irradiation and subsequently heating are comparable in energy-ray curability level with conventional light-curable resins, and such problems involving thick-wall curing and curing with contained fillers have not been solved yet. Such problems are dealt with by heat curing (to be applied only to surface layer) due to heating conducted after light curing, and as affairs stand now, such problems have not been solved yet.

If a technique has been able to be established which can rapidly cure the above-described thick-wall resin containing an energy ray blocking substance and being large in attenuation and absorption of the energy ray, light-curable resins can be applied not only to the conventional application fields but to various other application fields to which light-curable resins have been hardly applicable because of the above-described problems possessed by light-curable resins; such various other application fields include an application to an FRP matrix resin, in particular, a CFRP matrix resin. For FRP, various processing methods and various production methods have hitherto been employed, most of the used matrix resins being heat-curable or thermoplastic resins. In molding of FRP, in particular, CFRP, the following problems are involved: the processing cost is high because the temperature control is complicated and the curing time is long; curing of a large size FRP requires a large size heating furnace; a resin curable in a short time at normal temperature cannot be used for a large size FRP that requires a long molding time; the temperature variation of the resin viscosity varies the resin impregnation condition to make the molding difficult; and the residual solvent generates voids at the time of curing of the resin to degrade the quality of the moldings.

Recently, application of light-curable resins to matrix resins has attracted attention as a solution for such problems as described above. Typical examples of such a matrix resin curing method may include, in particular, a filament winding molding method of Loctite Corporation which uses UV curing and heat curing in combination (Loctite Corp.; Fiber/resin composition and the preparation method thereof; Patent Document 3: National Publication of International Patent Application No. 1995-507836). However, in the FRP molding method using such a composition, a resin-impregnated and uncured FRP is subjected to UV radiation so as to cure the surface thereof and so as to extremely thicken (gelatinize) the interior thereof and thereby enable the maintenance of the shape and resin-impregnated state thereof to some extent, and is thereafter heated to perfect the curing.

Accordingly, although in the above-described molding method, as compared to conventional production methods based on a thermoplastic or heat-curable resin, the temperature variation of the resin viscosity is extremely small and the handling after impregnation is easy, the above-described molding method still involves the following unresolved problems: a heat curing step is required to perfect the curing, and hence the processing cost is raised due to heating and lighting cost and working hours required for heat curing; completion of the curing takes a long time; and molding of a large size FRP requires a large size heating furnace.

Accordingly, in view of the above-described drawbacks of the conventional energy ray-curable resin, FRP and particularly CFRP, the present inventors have a diligent study on the energy ray curing of the thick-wall resin containing an energy ray blocking substance and the energy ray curing of FRP, in particular, CFRP. Consequently, the present inventors have developed: a novel resin curing method that enables even energy ray curing of resin systems that contain highly energy ray-blocking substances such as carbon, carbon fiber (CF), metals and other inorganic fillers, wherein examples of such resin systems include carbon fiber reinforced composite materials (CFRP) and carbon/metallic substance/inorganic substance-containing resins; the compositions and molded products produced by the novel method; and a technique, as a molding method, related to chain-curing resin compositions (Patent Document 4: Japanese Patent Laid-Open No. 11-193322; Patent Document 5: Japanese Patent Laid-Open No. 2001-89639).

However, it has been revealed that the increase of the fiber volume content (Vf) of an FRP molded body formed even by using such a resin composition prevents the progress of the chain curing as the case may be.

Patent Document 1: Japanese Patent Laid-Open No. 8-283388

Patent Document 2: Japanese Patent Publication No. 61-38023

Patent Document 3: National Publication of International Patent Application No. 1995-507836

Patent Document 4: Japanese Patent Laid-Open No. 11-193322

Patent Document 5: Japanese Patent Laid-Open No. 2001-89639

DISCLOSURE OF THE INVENTION

Problems to be Solved by the Invention

The present invention has been achieved in view of the above described circumstances, and an object of the present invention is to provide an RTM molding method enabling to yield an FRP molded body formed so as to be increased in the fiber volume content (hereinafter, abbreviated as Vf as the case may be) and to thereby be made more excellent in strength and lightweightness.

Means for Solving the Problems

For the purpose of achieving the above-described object, an aspect of the present invention is an RTM molding method in which a reinforcing fiber material is placed in a mold, a resin injection line and a suction line both communicatively connected to the interior of the mold are provided, the interior of the mold is reduced in pressure by suction and simultaneously a resin composition is injected into the interior of the mold to impregnate into the reinforcing fiber material to form an FRP molded body, the RTM molding method being characterized in that: the resin composition is a chain-curing resin composition; and after the initiation of the curing of the resin composition, the highest temperature at the curing head of the resin composition, undergoing chain curing, within 10 seconds after the initiation of the curing is increased to be higher by 50° C. or more than the temperature of the resin composition at after the impregnation and before the curing, and thus, the resin composition is chain-cured with a Vf of 41% or more. It is to be noted that after the initiation of the curing of the resin composition, the highest temperature at the curing head of the resin composition, undergoing chain curing, within 10 seconds after the initiation of the curing is increased so as to be higher preferably by a range from 100° C. to 350° C. than the temperature of the resin composition at after the impregnation and before the curing.

Alternatively, another aspect of the present invention is an RTM molding method in which a reinforcing fiber material is placed in a mold, a resin injection line and a suction line both communicatively connected to the interior of the mold are provided, the interior of the mold is reduced in pressure by suction and simultaneously a resin composition is injected into the interior of the mold to impregnate into the reinforcing fiber material to form an FRP molded body, the RTM molding method being characterized in that: the resin composition is a chain-curing resin composition; and after the initiation of the curing of the resin composition, the highest temperature at the curing head of the resin composition, undergoing chain curing, within 10 seconds after the initiation of the curing is increased so as to be the same as or higher than the heat-curing initiation temperature of the resin composition, and thus, the resin composition is chain-cured with a Vf of 41% or more.

In an embodiment of the RTM molding method according to the present invention, the resin composition is retained in a resin reservoir provided in the mold, and the resin in the resin reservoir is cured and consequently the temperature of the resin composition immediately after the curing can be made to increase.

In another embodiment of the RTM molding method according to the present invention, an energy ray is irradiated to the resin composition from an energy ray irradiation window disposed in the injection line and/or the suction line to initiate the chain curing of the resin composition, and further, the resin composition retained in the resin reservoir is cured and consequently the temperature of the resin composition immediately after the curing can be made to increase. Additionally, a carbon fiber is adopted as the reinforcing fiber material, and the carbon fiber is heated by flowing electric current therein and consequently the temperature of the resin composition immediately after the curing can be made to increase.

Advantages of the Invention

According to the present invention, there is provided an RTM molding method which enables to yield an FRP molded body formed so as to be increased in the fiber volume content and to thereby be made more excellent in strength and lightweightness.

BEST MODE FOR CARRYING OUT THE INVENTION

Hereinafter, an RTM molding method according to the present invention will be described in more detail with reference to the embodiments of the method.

Figure 1:
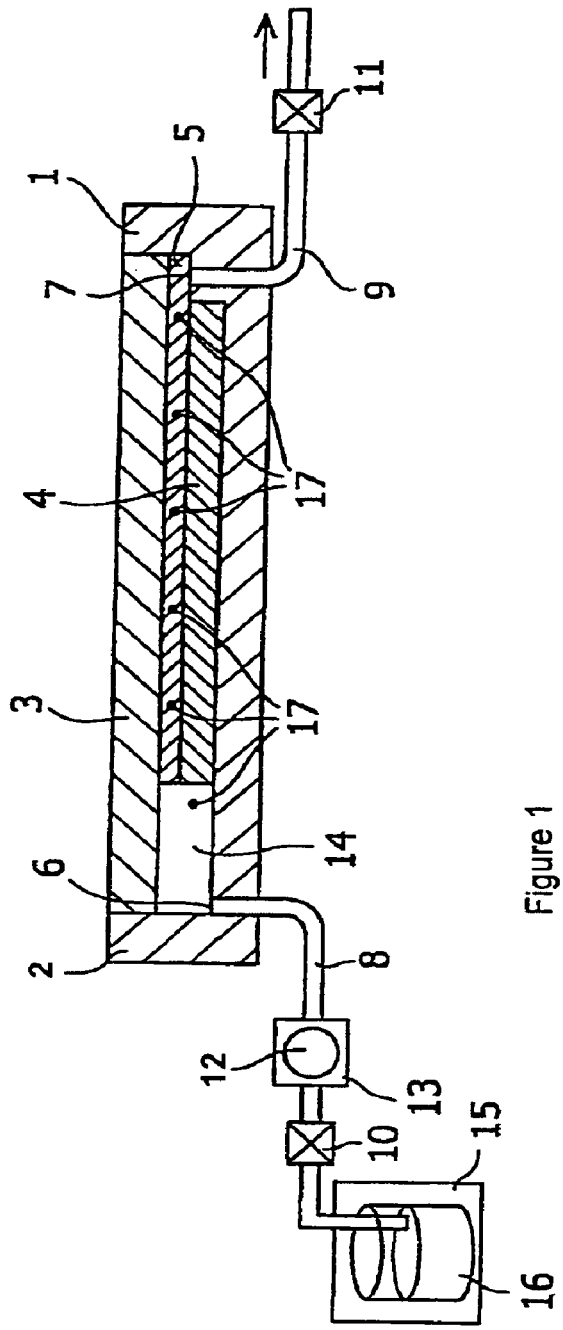
FIG. 1 is a schematic view illustrating an embodiment of an RTM molding method according to the present invention.

FIG. 1 shows an embodiment of a molding apparatus used for an RTM molding method according to the present invention.

FIG. 1 is a sectional view, wherein a mold 1 serving as a base is equipped with an aluminum jig 2 and upper and lower glass plates 3 and 4. As shown in the figure, in the mold 1, a flat platy reinforcing fiber material 5 is sandwiched between the glass plates 3 and 4. The reinforcing fiber material 5 is made of, for example, a laminate formed with a fabric made of the reinforcing fiber. The plates 3 and 4 are glass plates from the viewpoint of the heat-retaining property. It is to be noted that the mold 1 as a whole is preferably constructed so as to be high in heat-retaining property. This is for the purpose of promoting the below-described chain curing of the resin.

As presented in the sectional view of FIG. 1, a resin injection opening 6 is provided on the left end, and a suction opening 7 is provided on the right end. To the resin injection opening 6, a resin injection line 8 is connected. To the suction opening 7, a vacuum line 9 is connected.

The resin injection line 8 and the vacuum line 9 are formed of copper tube. It is to be noted that these lines 8 and 9 may also be formed of other materials as long as the embodiment of the RTM molding method is not hindered. Further, these lines 8 and 9 are provided with valves 10 and 11, respectively.

The resin injection line 8 is provided with an aluminum block 13 equipped with an energy ray transmission window 12. The aluminum block 13 is formed so as to be nearly cubic in shape. The energy ray transmission window 12 is provided with a glass plate fitted therein. In the aluminum block 13, a resin reservoir is formed.

In the present embodiment the block 13 is formed of aluminum. However, as long as a resin reservoir can be formed in the block and an energy ray transmission window can be provided to the block, no particular constraint is imposed on the material to form the block.

Further, a resin reservoir 14 is formed also in the space in the left end portion where the resin injection opening 6 is disposed.

The resin injection line 8 is connected to a resin tank 16 disposed in a pressurized vessel 15.

In the above-described configuration, a hermetically sealed structure is formed from the pressurized vessel 15 to the valve 11.

It is to be noted that in FIG. 1 the members represented by dots are thermocouples 17.

No particular constraint is imposed on the material of the reinforcing fiber adopted as the reinforcing fiber material 5; however, examples of such a reinforcing fiber include glass fiber, carbon fiber and aramid fiber. Among these, the use of carbon fiber generally makes it difficult to increase, in particular, the Vf.

It is to be noted that the RTM molding method according to the present invention enables to set the Vf at high values even for adoption of carbon fiber.

The matrix resin adopted in the RTM molding method according to the present invention is a chain-curing resin composition.

The "chain-curing resin composition" means a resin composition which is made to initiate curing by the irradiation of an energy ray such as UV (ultraviolet ray) and is cured by involving in the curing the chain curing that also utilizes the curing reaction heat of itself.

In other words, when once a chain-curing resin composition is irradiated with an energy ray, the irradiated portion thereof initiates curing, and then the thereby evolved curing heat effects the transition to the chain curing. This enables curing to occur irrespective of such factors as the accession or nonaccession of the energy ray and the presence of a blocking substance, leading to exhibition of prompt curing behavior even in such deep portions that are not reached by the energy ray. For example, a 1-cm thick CFRP plate can be cured in 3 minutes.

As such a chain-curing resin composition, there may be adopted a resin composition, described in Japanese Patent Laid-Open No. 11-193322, that contains a cationic photothermal polymerization initiator component and a cationic photopolymerization initiator in a specified weight ratio therebetween. This resin composition can cure a 1-cm thick CFRP plate in 3 minutes.

Among the resin compositions described in Japanese Patent Laid-Open No. 11-193322, particularly excellent is a resin composition that contains, in relation to 100 parts by weight of a photopolymerizable resin selected from a group consisting of photopolymerizable epoxy polymers such as an alicyclic epoxy, glycidyl ether epoxy and epoxidized polyolefin, and vinyl ether compounds, 0.6 to 5 parts by weight of a photopolymerization initiator component composed of at least two components wherein the cationic photothermal polymerization initiator component and the cationic photopolymerization initiator composing the above-described photopolymerization initiator component are mixed together so as for the weight ratio, (the cationic photothermal polymerization initiator component)/(the cationic photopolymerization initiator), to be 1 to 4.

It is to be noted that a photothermal polymerization initiator means a polymerization initiator that initiates polymerization under the action of both light and heat. Here, it may also be added that the polymerization initiator includes categories such as those capable of initiating polymerization under the action of both light and heat and those initiating under the action of either light or heat (Japanese Patent Laid-Open No. 7-300504, paragraph 0002).

Additionally, the chain-curing resin composition described in Japanese Patent Laid-Open No. 2001-89639 may also be adopted.

In this chain-curing resin composition described in Japanese Patent Laid-Open No. 2001-89639, a specific iron-arene compound is used as the photopolymerization initiator component, a curing agent component is mixed in a ratio of 0.1 to 1.4 moles to 1 mole of a photopolymerizable resin component capable of reacting with the curing agent component, and the chain curing thereby is made to occur; additionally, a specific sulfonium salt is used, a curing agent component is contained in a ratio of 0.1 to 1.4 moles to 1 mole of a photopolymerizable resin component capable of reacting with the curing agent component, and the photopolymerization initiator component is mixed in a ratio of 0.1 to 6.0 parts by weight to 100 parts by weight of the whole weight of all the components other than the photopolymerization initiator component in the resin composition and the chain curing thereby is made to occur by irradiation of UV light (ultraviolet ray).

Additionally, the resin composition of Elementis Specialties, Inc. described in U.S. Pat. No. 6,245,827 B1, may also be adopted. This resin composition adopts, as a photopolymerizable resin, an alicyclic epoxy, vinyl ether or a mixture prepared by mixing these with epoxy polyolefin, further contains at least one organic peroxide thermopolymerization initiator mixed with a cationic photopolymerization initiator, and contains as a sensitizer an α-hydroxy ketone. Similarly, this resin composition also undergoes chain curing.

Additionally, other examples of the matrix resin include: those resins undergoing the progress of chain curing according to the above-described mechanism such as a vinyl ether resin composition, a glycidole-containing resin composition and an oxetane resin composition; and other resin compositions manufactured by Elementis Specialties, Inc. that are made to be radical polymerizable compositions.

The RTM molding method according to the present embodiment includes the following operations with reference to the molding apparatus shown in FIG. 1. First, as shown in FIG. 1, a reinforcing fiber material 5 is interposed between the glass plates 3 and 4. Then the valves 10 and 11 are opened, and vacuum evacuation is conducted through the suction line 9. Thus, the chain-curing resin composition stored in the resin tank 16 disposed in the pressurized vessel 15 is made to flow out and penetrates, through the aluminum block 13, the resin injection line 8 and the resin reservoir 14, into the reinforcing fiber material 5. The resin composition flows out of the suction line 9, thus the interior of the mold 1 is checked to be sufficiently filled with the resin composition, and then the valve 11 is closed to complete the vacuum evacuation when the valve 10 is also closed.

In order to cure the resin, an energy ray is irradiated from the energy ray transmission window 12 in the aluminum block 13. For a UV-curing resin composition, UV ray is irradiated. This initiates the chain curing of the chain-curing resin composition.

The aluminum block 13 has the reservoir formed therein, and the reservoir undergoes temperature increase at the same time as the chain curing initiation. The heat obtained in the resin reservoir makes the resin composition in the resin injection line 8 successively undergo curing and heat evolution to progress the curing phenomenon so as to advance to the resin reservoir 14. In the resin reservoir 14, only the resin composition is present. In the resin reservoir 14, the chain curing progresses rapidly, and consequently the resin composition impregnated into the reinforcing fiber material 5 also acquires a sufficient polymerization temperature. In this way, the progress of the chain curing reaches the rightmost end in FIG. 1. The progress of the chain curing can be monitored with the thermocouples 17.

After the initiation of the curing of the resin composition, the highest temperature at the curing head portion of the resin composition undergoing chain curing within 10 seconds, preferably 5 seconds and more preferably 3 seconds after the initiation of the curing is increased to be higher by 50° C. or more than the temperature of the resin composition at after the impregnation and before the curing. The present inventors have verified that attainment of such temperature difference of 50° C. or more secures the progress of the chain curing. Additionally, the temperature difference concerned is preferably 70° C. or more, more preferably 100° C. or more, and furthermore preferably 200° C. or more. It is to be noted that the maintenance of such temperature difference enables to maintain the resin properties (for example, resin viscosity) preferable for work operations within a time period required for the molding operations carried out before curing such as the resin injection.

It is to be noted that the temperature increase slope of the curing head portion in the course of the progress of the chain curing is preferably 300° C./min or more.

The same purpose as described above can also be achieved in the following way: after the initiation of the curing of the resin composition, the highest temperature at the curing head portion of the resin composition undergoing chain curing within 10 seconds, preferably 5 seconds and more preferably 3 seconds after the initiation of the curing is increased so as to be the heat-curing initiation temperature of the resin composition or higher. It is to be noted that the highest temperature concerned is preferably increased so as to be higher by 20° C. or more than the heat-curing initiation temperature. It is to be noted that the highest temperature concerned is more preferably increased so as to be higher by 50° C. or more than the heat-curing initiation temperature. The heat-curing initiation temperature is the heat-curing initiation temperature specified by the curing initiation temperature (on set value) and the curing completion temperature (on set value) based on a measurement (temperature increase rate: 10° C./min) with a DSC (differential scanning calorimeter).

When carbon fiber is adopted as the reinforcing fiber, under the condition of Vf of 41% or more, even a chain-curing resin cannot be sufficiently cured. By providing a resin reservoir as in the present embodiment, the temperature required for the chain curing can be maintained. The liquid amount of the resin retained in the resin reservoir is set so as to meet the above-described temperature conditions.

In the molding method according to the present invention, even with Vf of 41 to 70%, the chain curing progresses to a sufficient extent.

The embodiment shown in FIG. 1 uses a glass plate for the upper side. However, a molding method (VARTM molding method) as described in Japanese Patent Laid-Open No. 2004-130598 in which a film-like material is used for the upper side may also be adopted. In this case, by forming grooves such as honeycomb-shaped grooves on the film-like cover, the chain curing of the resin composition portions at the grooves can be promoted.

In FIG. 1, the aluminum block 13 is provided as single member. However, two or more positions may be provided with aluminum blocks in such a way that an aluminum block is provided on the suction line 9 side. By branching the lines 8 and 9, curing may also be made to progress by starting from two or more positions. By installing a line independent of the resin injection line and the suction line such as the lines 8 and 9, and by providing a similar block, an energy ray irradiation may be enabled.

Additionally, the energy ray irradiation may also be made by means of a light guide path scheme using glass fiber, but not through a window.

Additionally, the way of temperature controlling may also include a way in which the mold itself is warmed (heated) and when the heat evolution increases to a superfluous extent, cooling may be carried out. However, the warming (heating) in the present invention is absolutely different from the heat curing of resins that cannot be chain-cured, but is exclusively an auxiliary heating to promote the chain curing. Alternatively, in this embodiment, the mold may be partially warmed (heated), needless to say.

Further, for the purpose of avoiding unscheduled initiation of the curing of the resin composition, a cooling device to maintain the resin tank 16 and the mold 1 at a temperature lower than the heat-curing initiation temperature by 10° C., preferably 20° C. and more preferably 30° C. may be incorporated.

Further, as a heating technique to progress the chain curing, when the reinforcing fiber material 5 is carbon fiber, an electric current may be made to pass directly through the carbon fiber for heating. Needless to say, heating with nichrome wire may also be made.

Yet additionally, depending on the adopted resin composition, the energy ray source is varied to be, for example, ultraviolet light, visible light and electron beam. Examples of the lamp that can be adopted include a mercury lamp, a metal halide lamp, an electrodeless lamp (for example, a fusion UV lamp) and an LED. The chain curing can also be initiated by heating; in this case, through taking advantage of the feature of the chain curing, the molding can be carried out even by heating of only a specified portion such as a portion of the resin injection line. The heating temperature is preferably such that heating is made to the chain-curing initiation temperature or higher.

It is to be noted that an FRP molded body obtained by chain curing of the resin composition may be further heated as a whole to make the resin curing perfect. However, such an additional heating does not take a long time in a manner different from the heat curing of a resin that cannot be chain-cured.

Figure 2:
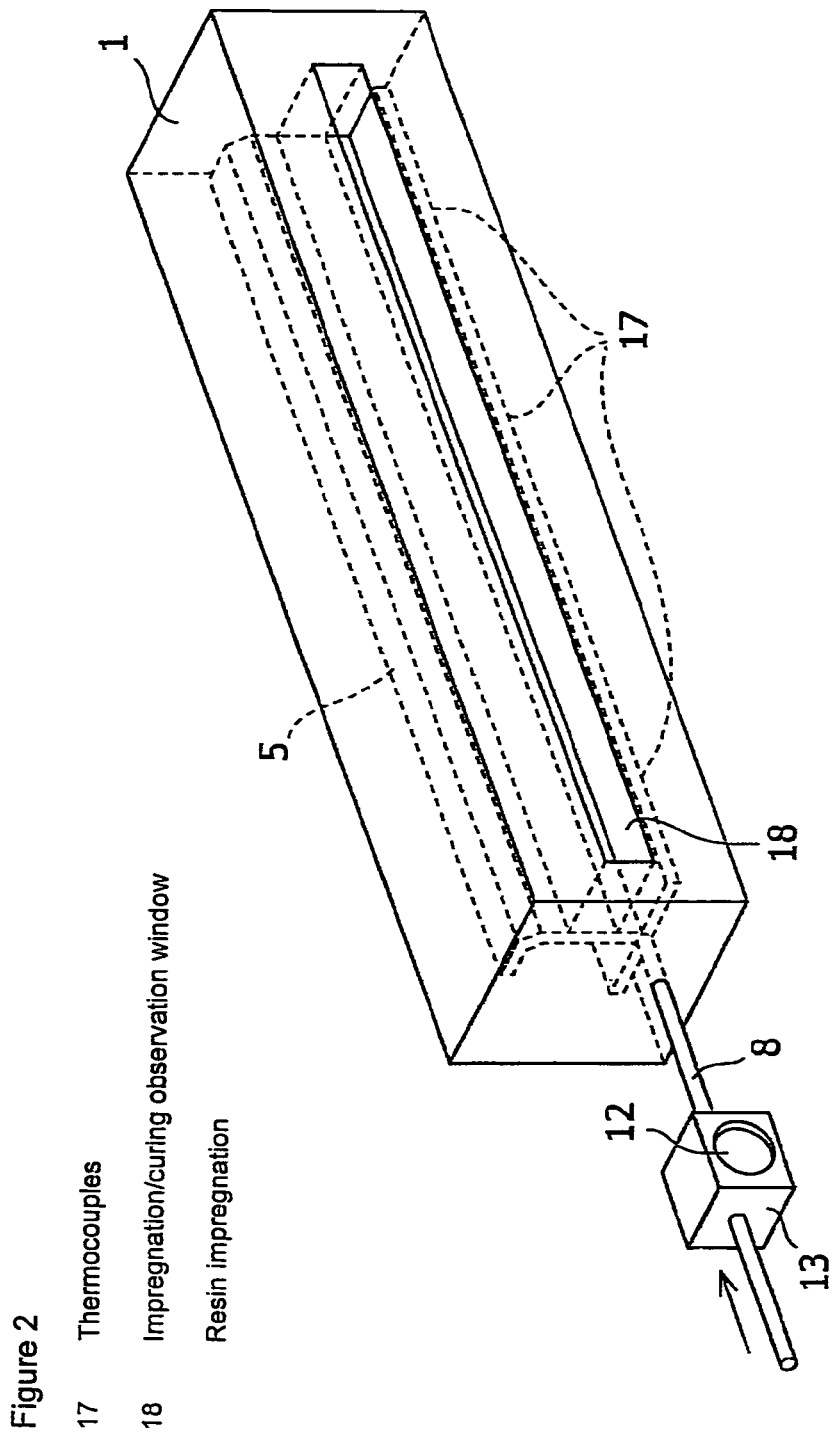
FIG. 2 is a schematic view illustrating another embodiment of the RTM molding method according to the present invention.

Next, FIG. 2 shows an embodiment in which a J-type-frame-shaped FRP molded body is obtained by the RTM molding method according to the present invention. In FIG. 2, the constituent elements substantially the same as those in FIG. 1 are marked with the same reference numerals as in FIG. 1.

In this embodiment, the resin reservoir in the mold 1 is not shown in FIG. 2, but may be provided in a manner similar to FIG. 1. In this embodiment, in addition to the thermocouples 17, an observation window 18 for observation of the impregnation and curing is formed along the lengthwise direction.

Also in this embodiment, the same RTM molding method as in the description with reference to FIG. 1 can be implemented. The FRP molded bodies thus obtained can be utilized particularly as frame members used for airplanes.

The invention claimed is:

1. An RTM molding method in which a reinforcing fiber material is placed in a mold, a resin injection line and a suction line both communicatively connected to the interior of the mold are provided, the interior of the mold is reduced in pressure by suction and simultaneously a resin composition is injected into the interior of the mold to impregnate into the reinforcing fiber material to form an FRP molded body, the RTM molding method being characterized in that:

the resin composition is a chain-curing resin composition; and after an initiation of the curing of the resin composition, the highest temperature at the curing head of the resin composition undergoing chain curing, within 10 seconds after the initiation of the curing, is increased so as to be the same as or higher than the heat-curing initiation temperature of the resin composition, and thus, the resin composition is chain-cured with a Vf of 41% or more.

2. The RTM molding method according to claim 1, wherein:

the resin composition is retained in a resin reservoir provided in the mold; and the resin in the resin reservoir is cured and consequently the temperature of the resin composition immediately after the curing is made to increase.

3. The RTM molding method according to claim 1, wherein:

an energy ray is irradiated to the resin composition from an energy ray irradiation window disposed in the injection line and/or the suction line to initiate the chain curing of the resin composition; and further, the resin composition retained in a resin reservoir provided in the mold is cured and consequently the temperature of the resin composition immediately after the curing is made to increase.

4. The RTM molding method according to claim 1, wherein:

the reinforcing fiber material is a carbon fiber; and the carbon fiber is heated by flowing electric current therein and consequently the temperature of the resin composition immediately after the curing is made to increase.

* * * * *